US009635024B2

(12) United States Patent
Pisharody et al.

(10) Patent No.: US 9,635,024 B2
(45) Date of Patent: Apr. 25, 2017

(54) METHODS FOR FACILITATING IMPROVED USER AUTHENTICATION USING PERSISTENT DATA AND DEVICES THEREOF

(71) Applicant: F5 Networks, Inc., Seattle, WA (US)

(72) Inventors: Vinod Pisharody, San Jose, CA (US); Amit Jain, Santa Clara, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 14/570,128

(22) Filed: Dec. 15, 2014

(65) Prior Publication Data
US 2015/0215314 A1    Jul. 30, 2015

Related U.S. Application Data

(60) Provisional application No. 61/916,553, filed on Dec. 16, 2013.

(51) Int. Cl.
*H04L 29/06*  (2006.01)
*G06F 21/32*  (2013.01)
*G06F 21/31*  (2013.01)

(52) U.S. Cl.
CPC ......... *H04L 63/0861* (2013.01); *G06F 21/31* (2013.01); *G06F 21/32* (2013.01); *H04L 2463/082* (2013.01)

(58) Field of Classification Search
None
See application file for complete search history.

(56) References Cited

U.S. PATENT DOCUMENTS 5,388,237 A    2/1995  Sodos
5,742,765 A    4/1998  Wong et al.
(Continued)

FOREIGN PATENT DOCUMENTS

EP    1813084 A1    8/2007
WO    2004007993 A2    9/2004
(Continued)

OTHER PUBLICATIONS

Chong, Lee Gin; Kiong, Loo Chu; Letchumanan, Chockalingam. Two-Factor Face Authentication: Topographic Independent Component Analysis (TICA) and Multispace Random Projection (MRP). International Conference of Soft Computing and Pattern Recognition, 2009. http://ieeexplore.ieee.org/stamp/stamp.jsp?arnumber=5368670.*
(Continued)

*Primary Examiner* — Jeremiah Avery
(74) *Attorney, Agent, or Firm* — LeClairRyan, a Professional Corporation

(57) ABSTRACT

A method, non-transitory computer readable medium, and access policy management computing device that obtains a first set of attributes based on a login request received from a client device. The first set of attributes includes at least credentials for a user of the client device. A persistent data store record for the user is identified and a second set of attributes associated with the user, and included in the persistent data store record, is imported into a session cache record for the user. A fingerprint including the second set of attributes is compared to the first set of attributes. A multifactor or single factor authentication is initiated based on a result of the comparison to determine when the credentials for the user are valid. A session for the user is established and access by the user to network resource(s) is allowed, when the credentials for the user are valid.

15 Claims, 7 Drawing Sheets

(56) References Cited

U.S. PATENT DOCUMENTS

| | | |
|---|---|---|
| 5,761,534 A | 6/1998 | Lundberg et al. |
| 5,797,033 A | 8/1998 | Ecclesine |
| 5,828,835 A | 10/1998 | Isfeld et al. |
| 5,941,988 A | 8/1999 | Bhagwat et al. |
| 6,026,443 A | 2/2000 | Oskouy et al. |
| 6,115,802 A | 9/2000 | Tock et al. |
| 6,529,508 B1 | 3/2003 | Li et al. |
| 6,700,871 B1 | 3/2004 | Harper et al. |
| 6,748,457 B2 | 6/2004 | Fallon et al. |
| 6,781,990 B1 | 8/2004 | Puri et al. |
| 6,820,133 B1 | 11/2004 | Grove et al. |
| 6,904,040 B2 | 6/2005 | Salapura et al. |
| 6,999,457 B2 | 2/2006 | Shinohara |
| 7,065,630 B1 | 6/2006 | Ledebohm et al. |
| 7,107,348 B2 | 9/2006 | Shimada et al. |
| 7,117,308 B1 | 10/2006 | Mitten et al. |
| 7,142,540 B2 | 11/2006 | Hendel et al. |
| 7,174,393 B2 | 2/2007 | Boucher et al. |
| 7,236,491 B2 | 6/2007 | Tsao et al. |
| 7,272,150 B2 | 9/2007 | Bly et al. |
| 7,281,030 B1 | 10/2007 | Davis |
| 7,324,525 B2 | 1/2008 | Fuhs et al. |
| 7,353,326 B2 | 4/2008 | Cho et al. |
| 7,355,977 B1 | 4/2008 | Li |
| 7,376,772 B2 | 5/2008 | Fallon |
| 7,403,542 B1 | 7/2008 | Thompson |
| 7,411,957 B2 | 8/2008 | Stacy et al. |
| 7,415,034 B2 | 8/2008 | Muller et al. |
| 7,420,931 B2 | 9/2008 | Nanda et al. |
| 7,457,313 B2 | 11/2008 | Patrick |
| 7,475,122 B2 | 1/2009 | Azpitarte |
| 7,478,186 B1 | 1/2009 | Onufryk et al. |
| 7,496,689 B2 | 2/2009 | Sharp et al. |
| 7,496,695 B2 | 2/2009 | Go et al. |
| 7,500,028 B2 | 3/2009 | Yamagishi |
| 7,512,078 B2 | 3/2009 | Swain |
| 7,512,721 B1 | 3/2009 | Olson |
| 7,533,197 B2 | 5/2009 | Leonard et al. |
| 7,552,232 B2 | 6/2009 | Helmer, Jr. et al. |
| 7,558,910 B2 | 7/2009 | Alverson et al. |
| 7,571,299 B2 | 8/2009 | Loeb |
| 7,590,753 B2 | 9/2009 | Wolde et al. |
| 7,620,046 B2 | 11/2009 | Ronciak et al. |
| 7,620,071 B2 | 11/2009 | Makineni et al. |
| 7,621,162 B2 | 11/2009 | Bartky |
| 7,647,416 B2 | 1/2010 | Chiang et al. |
| 7,657,659 B1 | 2/2010 | Lambeth et al. |
| 7,660,916 B2 | 2/2010 | Moskalev et al. |
| 7,668,727 B2 | 2/2010 | Mitchell et al. |
| 7,668,851 B2 | 2/2010 | Triplett |
| 7,710,989 B2 | 5/2010 | Chew |
| 7,729,239 B1 | 6/2010 | Aronov et al. |
| 7,734,809 B2 | 6/2010 | Joshi et al. |
| 7,735,099 B1 | 6/2010 | Micalizzi, Jr. |
| 7,742,412 B1 | 6/2010 | Medina |
| 7,784,093 B2 | 8/2010 | Deng et al. |
| 7,813,277 B2 | 10/2010 | Okholm et al. |
| 7,826,487 B1 | 11/2010 | Mukerji et al. |
| 7,840,841 B2 | 11/2010 | Huang et al. |
| 7,877,524 B1 | 1/2011 | Annem et al. |
| 7,916,728 B1 | 3/2011 | Mimms |
| 7,936,772 B2 | 5/2011 | Kashyap |
| 7,991,918 B2 | 8/2011 | Jha et al. |
| 7,996,569 B2 | 8/2011 | Aloni et al. |
| 8,006,016 B2 | 8/2011 | Muller et al. |
| 8,077,620 B2 | 12/2011 | Solomon et al. |
| 8,099,528 B2 | 1/2012 | Millet et al. |
| 8,103,809 B1 | 1/2012 | Michels et al. |
| 8,112,491 B1 | 2/2012 | Michels et al. |
| 8,112,594 B2 | 2/2012 | Giacomoni et al. |
| 8,219,609 B1 | 7/2012 | Bhattacharjee et al. |
| 8,233,380 B2 | 7/2012 | Subramanian et al. |
| 8,279,865 B2 | 10/2012 | Giacomoni et al. |
| 8,306,036 B1 | 11/2012 | Bollay et al. |
| 8,346,993 B2 | 1/2013 | Michels et al. |
| 8,447,884 B1 | 5/2013 | Baumann |
| 8,448,234 B2 | 5/2013 | Mondaeev et al. |
| 8,527,758 B2 * | 9/2013 | Mansour ............... H04L 9/3218 380/28 |
| 8,799,403 B2 | 8/2014 | Chan et al. |
| 8,848,715 B2 | 9/2014 | Izenberg et al. |
| 8,880,632 B1 | 11/2014 | Michels et al. |
| 8,880,696 B1 | 11/2014 | Michels et al. |
| 8,984,178 B2 | 3/2015 | Michels et al. |
| 9,032,113 B2 | 5/2015 | Conroy et al. |
| 2002/0156927 A1 | 10/2002 | Boucher et al. |
| 2003/0067930 A1 | 4/2003 | Salapura et al. |
| 2003/0204636 A1 | 10/2003 | Greenblat et al. |
| 2004/0202161 A1 | 10/2004 | Stachura et al. |
| 2004/0249881 A1 | 12/2004 | Jha et al. |
| 2004/0249948 A1 | 12/2004 | Sethi et al. |
| 2004/0267897 A1 | 12/2004 | Hill et al. |
| 2005/0007991 A1 | 1/2005 | Ton et al. |
| 2005/0083952 A1 | 4/2005 | Swain |
| 2005/0114559 A1 | 5/2005 | Miller |
| 2005/0175014 A1 | 8/2005 | Patrick |
| 2005/0213570 A1 | 9/2005 | Stacy et al. |
| 2006/0007928 A1 | 1/2006 | Sangillo |
| 2006/0067349 A1 | 3/2006 | Ronciak et al. |
| 2006/0104303 A1 | 5/2006 | Makineni et al. |
| 2006/0221832 A1 | 10/2006 | Muller et al. |
| 2006/0221835 A1 | 10/2006 | Sweeney et al. |
| 2006/0235996 A1 | 10/2006 | Wolde et al. |
| 2006/0253583 A1* | 11/2006 | Dixon ............... H04L 63/1441 709/225 |
| 2006/0288128 A1 | 12/2006 | Moskalev et al. |
| 2007/0087756 A1* | 4/2007 | Hoffberg ............ G06Q 10/0631 455/450 |
| 2008/0126509 A1 | 5/2008 | Subramanian et al. |
| 2008/0177994 A1* | 7/2008 | Mayer ................. G06F 9/4418 713/2 |
| 2008/0184248 A1 | 7/2008 | Barua et al. |
| 2008/0219279 A1 | 9/2008 | Chew |
| 2009/0003204 A1 | 1/2009 | Okholm et al. |
| 2009/0016217 A1 | 1/2009 | Kashyap |
| 2009/0089619 A1 | 4/2009 | Huang et al. |
| 2009/0222598 A1 | 9/2009 | Hayden |
| 2009/0248911 A1 | 10/2009 | Conroy et al. |
| 2010/0082849 A1 | 4/2010 | Millet et al. |
| 2010/0094945 A1 | 4/2010 | Chan et al. |
| 2011/0087888 A1 | 4/2011 | Rennie |
| 2011/0090541 A1* | 4/2011 | Harper ................. G06F 21/32 358/474 |
| 2012/0191800 A1 | 7/2012 | Michels et al. |
| 2013/0054433 A1* | 2/2013 | Giard ................... H04L 67/22 705/34 |
| 2013/0055367 A1* | 2/2013 | Kshirsagar ............ G06F 21/32 726/6 |
| 2013/0067546 A1* | 3/2013 | Thavasi ................ G06F 21/31 726/7 |
| 2013/0262873 A1* | 10/2013 | Read ..................... H04W 12/06 713/186 |
| 2013/0282589 A1* | 10/2013 | Shoup ................... G06F 21/34 705/67 |
| 2014/0032695 A1 | 1/2014 | Michels et al. |
| 2014/0185422 A1 | 7/2014 | Kobayashi et al. |
| 2014/0301207 A1 | 10/2014 | Durand et al. |

FOREIGN PATENT DOCUMENTS

| | | |
|---|---|---|
| WO | 2006055494 A1 | 5/2006 |
| WO | 2009158680 A1 | 12/2009 |

OTHER PUBLICATIONS

Hazlewood, Victor; Kovatch, Patricia; Ezell, Matthew; Johnson, Matthew; Redd, Patti. Improved Grid Security Posture through Multi-factor Authentication. 12th IEEE/ACM International Conference on Grid Computing (GRID), 2011. http://ieeexplore.ieee.org/stamp/stamp.jsp?arnumber=6076505.*

Mohammed, Mahmoud Musa; Elsadig, Dr. Muna. A multi-layer of multi factors authentication model for online banking services. 2013

(56) References Cited

OTHER PUBLICATIONS

International Conference on Computing, Electrical and Electronics Engineering (ICCEEE) http://ieeexplore.ieee.org/stamp/stamp.jsp?arnumber=6633936.*

Traore, Issa; Woungang, Isaac; Obaidat, Mohammad S.; Nakkabi Youssef; Lai, Iris.Combining Mouse and Keystroke Dynamics Biometrics for Risk-Based Authentication in Web Environments. 2012 Fourth International Conference on Digital Home (ICDH). http://ieeexplore.ieee.org/stamp/stamp.jsp?arnumber=6376399.*

"Gigabit Ethernet/PCI Network Interface Card; Host/NIC Software Interface Definition," Jul. 1999, pp. 1-80, Revision 12.4.13, P/N 020001, Alteon WebSystems, Inc., San Jose, California.

Bell Laboratories, Lucent Technologies, "Layer 4/7 Switching and Other Custom IP Traffic Processing using the NEPPI API," Bell Laboratories, Lucent Technologies, pp. 1-11, Murray Hill, NJ.

Cavium Networks, "PCI, PCI-X," at (http://www.cavium.com/acceleration_boards_PCI_PCI-X.htm (Downloaded Oct. 2008), Cavium Networks—Products > Acceleration Boards > PCI, PCI-X).

Cavium Networks, "NITROX™ XL Security Acceleration Modules PCI 3V or 3V/5V-Universal Boards for SSL and IPSec," at http://www.Caviumnetworks.com, 2002, pp. 1, Mountain View, CA USA.

Cavium Networks, "Cavium Networks Product Selector Guide—Single & Multi-Core MIPS Processors, Security Processors and Accelerator Boards," 2008, pp. 1-44, Mountain View, CA, US.

"Chapter 15, Memory Mapping and DMA," Memory Management in Linux, ch15.13676, accessed on Jan. 25, 2005, pp. 412-463.

Comtech AHA Corporation, "Comtech AHA Announces 3.0 Gbps GZIP Compression/Decompression Accelerator AHA362-PCIX offers high-speed GZIP compression and decompression," www.aha.com, Apr. 20, 2005, pp. 1-2, Moscow, ID, USA.

Comtech AHA Corporation, "Comtech AHA Announces GZIP Compression and Decompression IC Offers the highest speed and compression ratio performance in hardware on the market," www.aha.com, Jun. 26, 2007, pp. 1-2, Moscow, ID, USA.

Eventhelix, "DMA and Interrupt Handling," <http://www.eventhelix.com/RealtimeMantra/FaultHandling/dma_interrupt_handling.htm>, Jan. 29, 2010, pp. 1-4, EventHelix.com.

Eventhelix, "TCP-Transmission Control Protocol (TCP Fast Retransmit and Recovery)," Mar. 28, 2002, pp. 1-5, EventHelix.com.

Harvey et al., "DMA Fundamentals on Various PC Platforms," Application Note 011, Apr. 1999, pp. 1-20, National Instruments Corporation.

Mangino, John, "Using DMA with High Performance Peripherals to Maximize System Performance," WW TMS470 Catalog Applications, SPNA105 Jan. 2007, pp. 1-23.

Mogul, Jeffrey C., "The Case for Persistent-Connection HTTP," SIGCOMM '95, Digital Equipment Corporation Western Research Laboratory, 1995, pp. 1-15, Cambridge, Maine.

"Plan 9 kernel history: overview / file list / diff list," <http://switch.com/cgi-bin/plan9history.cgi?f=2001/0126/pc/therga620.com>, accessed Oct. 22, 2007, pp. 1-16.

Rabinovich et al., "DHTTP: An Efficient and Cache-Friendly Transfer Protocol for the Web," IEEE/ACM Transactions On Networking, Dec. 2004, pp. 1007-1020, vol. 12, No. 6.

Salchow, Jr., KJ, "Clustered Multiprocessing: Changing the Rules of the Performance Game," F5 White Paper, Jan. 2008, pp. 1-11, F5 Networks, Inc.

Stevens, W., "TCP Slow Start, Congestion Avoidance, Fast Retransmit, and Fast Recovery Algorithms," Network Working Group, RFC 2001, Jan. 1997, pp. 1-6.

Wadge, Wallace, "Achieving Gigabit Performance on Programmable Ethernet Network Interface Cards," May 29, 2001, pp. 1-9.

Welch, Von, "A User's Guide to TCP Windows," http://www.vonwelch.com/report/tcp_windows, updated 1996, last accessed Jan. 29, 2010, pp. 1-5.

Wikipedia, "Direct memory access," <http://en.wikipedia.org/wiki/Direct_memory_access>, accessed Jan. 29, 2010, pp. 1-6.

Wikipedia, "Nagle's algorithm," <http://en.wikipedia.org/wiki/Nagle%27s_algorithm>, 2 pages.

* cited by examiner

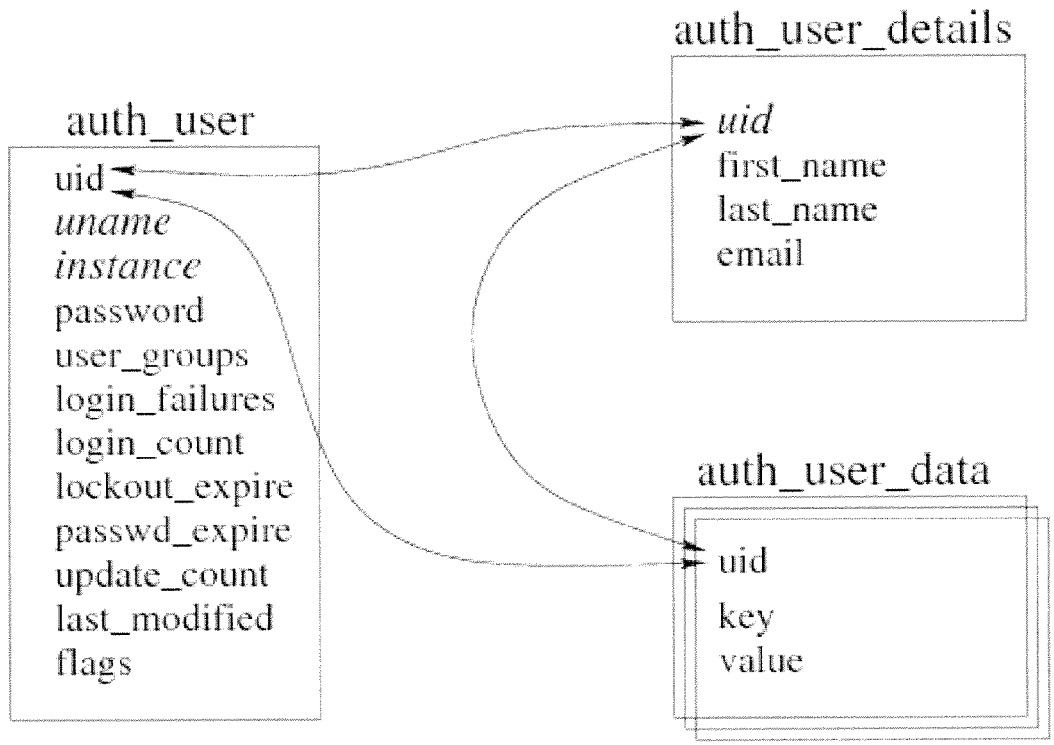

| | |
|---|---|
| uid | unique id for every user |
| uname | user name (login name) |
| instance | virtual database instance |
| password | hashed user password |
| user_groups | names of groups user belongs to (';' seperated) |
| login_failures | consequtive failed login attempts |
| login_count | successful login count |
| lockout_expire | seconds since epoch when lockout expires |
| passwd_expire | seconds since epoch when passwd expires |
| update_count | for versioning |
| last_modified | for timestamping changes |
| flags | misc binary information |
| key | any key defined by customer/admin |
| value | any value corresponding to key |

FIG. 4

METHODS FOR FACILITATING IMPROVED USER AUTHENTICATION USING PERSISTENT DATA AND DEVICES THEREOF

This application claims the benefit of U.S. Provisional Patent Application Ser. No. 61/916,553, filed on Dec. 16, 2013, which is hereby incorporated by reference in its entirety.

FIELD

This technology generally relates to user authentication methods and devices and, more specifically, to facilitating improved user authentication using persistent data.

BACKGROUND

Many networks require user authentication prior to establishing a session for a user and allowing the user to communicate with one or more server devices to access one or more resources hosted by the one or more server devices. Authentication services can be provided by an authentication gateway that requests and/or obtains user attributes, such as a unique user name, a password, and/or a user group for a user and processes the attributes using stored data, or sends the attributes to an authentication server, in order to authenticate the user. Once authenticated, a user session is created by the authentication gateway and information regarding the user and the client device associated with the user can be stored in a session database.

Subsequent to the user logging out, being inactive for a period of time, or as a result of a service restart or failure, for example, the information associated with the session for the user is removed from the session database. Accordingly, the session information will not be available to the authentication gateway during a subsequent session for the user. As the session information is transient, the authentication gateway cannot track user activity across multiple login sessions, utilize prior session information in order to more quickly and/or effectively authenticate the user for a subsequent session, provide comprehensive reporting of activity across users and sessions, and/or facilitate the communication of network resources in a relatively tailored manner for users, for example.

SUMMARY

A method for facilitating improved user authentication using persistent data includes obtaining by an access policy management device a first set of attributes based on a login request received from a client device. The first set of attributes includes at least credentials for a user of the client device. A persistent data store record for the user is identified by the access policy management device and at least a second set of attributes associated with the user, and included in the persistent data store record, is imported into a session cache record for the user. A fingerprint including at least a subset of the second set of attributes is compared by the access policy management device to the first set of attributes. One of a multifactor authentication or a single factor authentication is initiated by the access policy management device based on a result of the comparison to determine when the credentials for the user are valid. A session for the user is established by the access policy management device and access by the user to one or more network resources is allowed, when the credentials for the user are determined to be valid.

An application acceleration management computing device includes a processor and a memory coupled to the processor, wherein the memory includes a session cache and the processor is configured to be capable of executing programmed instructions including and stored in the memory to obtain a first set of attributes based on a login request received from a client device. The first set of attributes includes at least credentials for a user of the client device. A persistent data store record for the user is identified and at least a second set of attributes associated with the user, and included in the persistent data store record, is imported into a record for the user in the session cache. A fingerprint including at least a subset of the second set of attributes is compared to the first set of attributes. One of a multifactor authentication or a single factor authentication is initiated based on a result of the comparison to determine when the credentials for the user are valid. A session for the user is established and access by the user to one or more network resources is allowed, when the credentials for the user are determined to be valid.

A non-transitory computer readable medium having stored thereon instructions for facilitating improved user authentication using persistent data comprising executable code which when executed by a processor, causes the processor to perform steps including obtaining a first set of attributes based on a login request received from a client device. The first set of attributes includes at least credentials for a user of the client device. A persistent data store record for the user is identified and at least a second set of attributes associated with the user, and included in the persistent data store record, is imported into a session cache record for the user. A fingerprint including at least a subset of the second set of attributes is compared to the first set of attributes. One of a multifactor authentication or a single factor authentication is initiated based on a result of the comparison to determine when the credentials for the user are valid. A session for the user is established and access by the user to one or more network resources is allowed, when the credentials for the user are determined to be valid.

This technology provides a number of advantages including more efficient and effective methods, non-transitory computer readable media, and devices for authenticating users prior to providing access to network resources. With this technology, historical data persists across sessions and can be used to determine a level of confidence that a user is authorized to access a network resource, as well as to provide a more appropriate and effective authentication process based on the confidence level. Advantageously, a session cache is synchronized with the persistent data store to facilitate more efficient interaction with the stored data for active sessions.

BRIEF DESCRIPTION OF THE DRAWINGS

FIG. 4 is an exemplary schema corresponding to exemplary attributes maintained by the APM computing device illustrated in FIGS. 1 and 2 in each record of a persistent data store;

DETAILED DESCRIPTION

Figure 1:
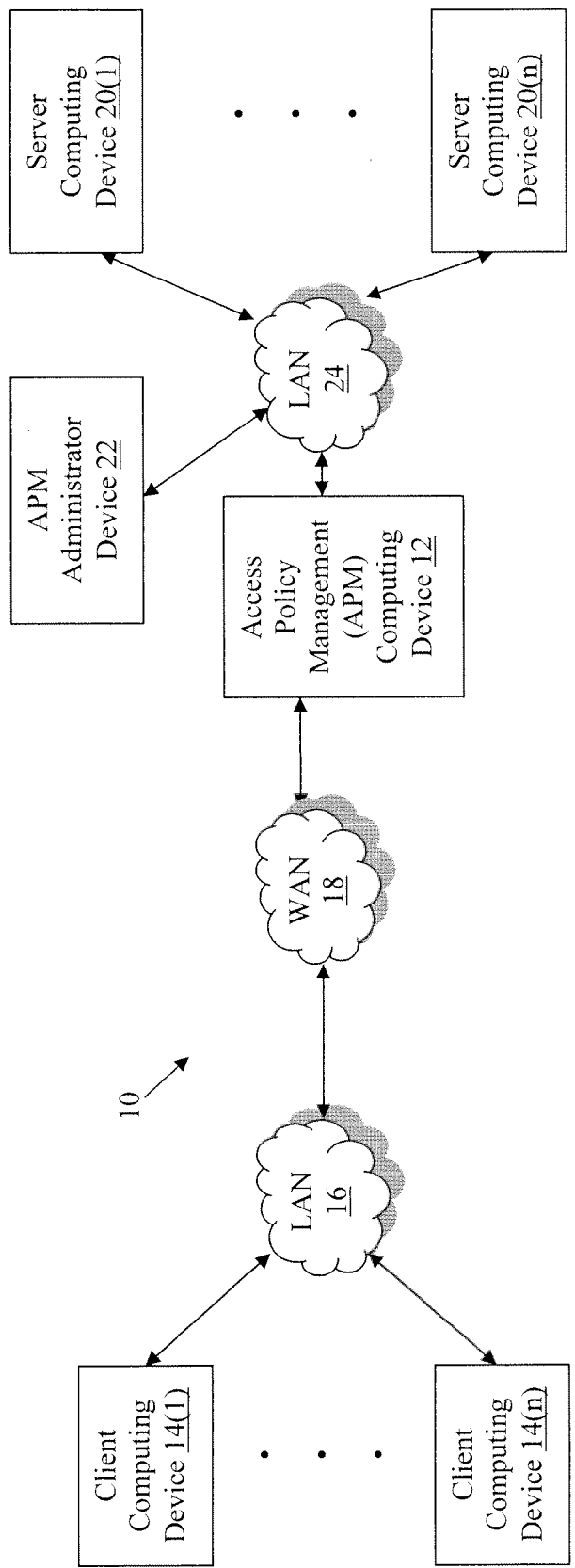
FIG. 1 is a block diagram of a network environment with an exemplary access policy management (APM) computing device.

Referring to FIG. 1, a block diagram of an exemplary network environment 10 including an exemplary access policy management (APM) computing device 12 is illustrated. In this example, the APM computing device 12 is coupled to a plurality of client devices 14(1)-14(n) through a local area network (LAN) 16 and a wide area network (WAN) 18 and a plurality of server devices 20(1)-20(n) and an APM administrator device 22 through another LAN 24, although the APM computing device 12, client devices 14(1)-14(n), server devices 20(1)-20(n), and/or APM Administrator device 22, may be coupled together via other topologies. Additionally, the network environment 10 may include other network devices such as one or more routers and/or switches, for example. This technology provides a number of advantages including methods, non-transitory computer readable media, and devices that facilitate authentication services using historical, persistent data associated with users and prior user sessions.

Figure 2:
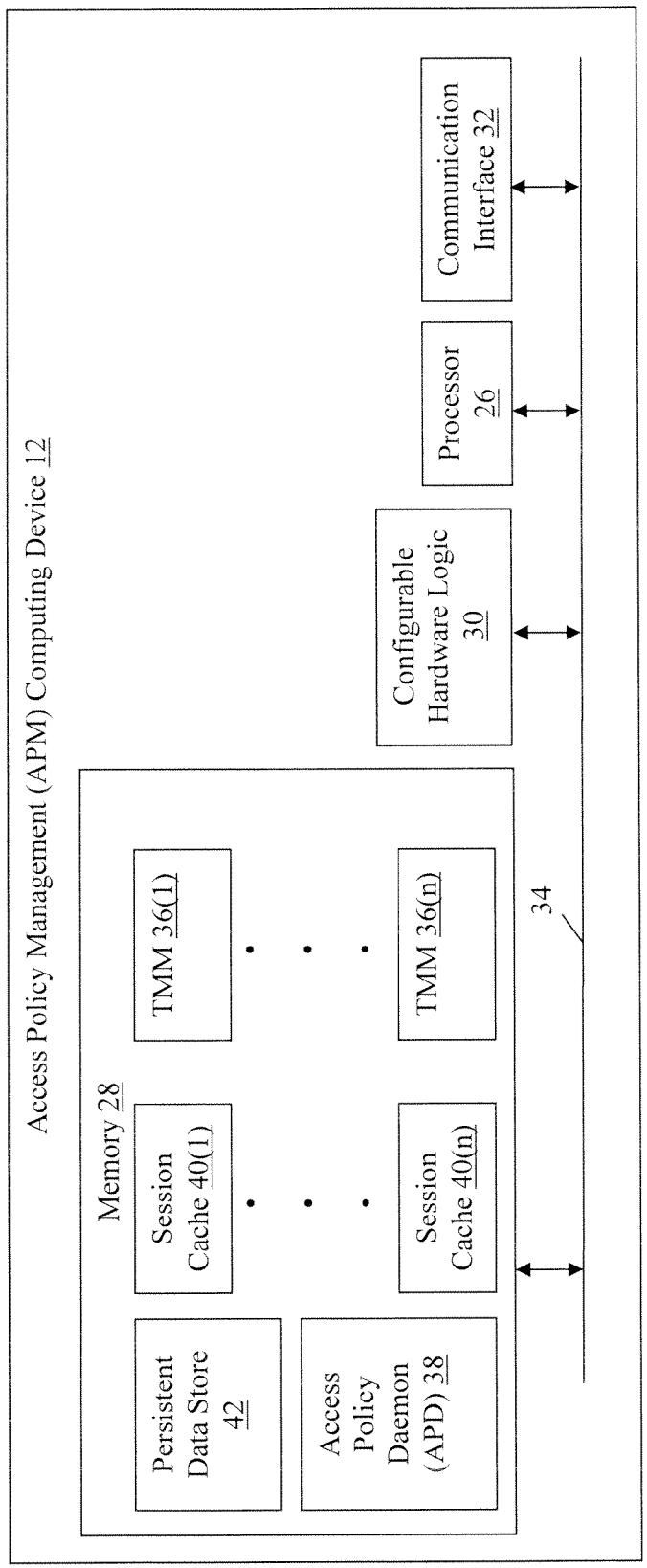
FIG. 2 is a block diagram of the exemplary APM computing device illustrated in FIG. 1.

Referring to FIGS. 1-2, the APM computing device 12 may perform any number of functions, such as providing authentication, authorization, and accounting (AAA) services, as well as optionally optimizing, securing, and/or load balancing the network traffic exchanged between the client devices 14(1)-14(n) and the server devices 20(1)-20(n), for example. The APM computing device 12 includes a processor 26, a memory 28, optional configurable hardware logic 30, and a communication interface 32 which are coupled together by a bus 34 or other communication link, although the APM computing device 12 may include other types and numbers of elements in other configurations.

The processor 26 of the APM computing device 12 may execute one or more programmed instructions stored in the memory 28 of the APM computing device 12 for the any number of the functions identified above and/or described herein for facilitating secure user access to web applications or other network resources hosted by the server devices 20(1)-209(n) and, optionally, managing network traffic and/or optimizing service of resource requests, for example. The processor 26 of the APM computing device 12 may include one or more central processing units and/or general purpose processors with one or more processing cores, for example.

The memory 28 of the APM computing device 12 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), hard disks, solid state drives, or other computer readable medium which is read from and written to by a magnetic, optical, or other reading and writing system that is coupled to the processor 26, can be used for the memory 28.

The memory 28 of the APM computing device 12 in this example includes programmed instructions for a plurality of optional traffic management microkernels (TMMs) 36(1)-36(n) and an access policy daemon (APD) 38. Additionally, the memory 28 in this example includes a plurality of session caches 40(1)-40(n), each associated with one of the TMMs 36(1)-36(n) and a persistent data store 42. The TMMs 36(1)-36(n) in this example, when executed by the processor 26, are configured to implement traffic management functionality including the processing and routing of network traffic communicated between the client devices 14(1)-14(n) and the server devices 20(1)-20(n). The APD 38 in this example, when executed by the processor 26, is configured to implement access policy management functionality including communication with the session cache(s) 40(1)-40(n) and persistent data store 42 to authenticate users, as described and illustrated in more detail later.

The session caches 40(1)-40(n) in this example store at least data associated with users currently active and with established sessions, as described and illustrated in more detail later. Generally, the session caches comprise transient memory such as RAM, for example, although any other type of memory can also be used. Additionally, only one session cache can be used in other examples, including exampled in which the optional TMMs 36(1)-36(n) are not present.

The persistent data store 42 can be a MySQL database, for example, that is configured to persistently store data associated with both active and inactive users across user sessions and despite any service restart or failure, as described and illustrated in more detail later. While the persistent data store 42 is illustrated in FIG. 2 as included in the memory 28 of the APM computing device 12, in other examples, the persistent data store 42 can be located elsewhere in the network environment 10 in a location accessible by the APM computing device 12.

The communication interface 32 operatively couples and communicates between the APM computing device 12, the client devices 14(1)-14(n), server devices 20(1)-20(n), and APM administrator device 22, which are all coupled together by the LANs 16 and 24 and the WAN 18, although other types and numbers of communication networks or systems with other types and numbers of connections and configurations to other devices and elements. By way of example only, the LANs 16 and 24 and the WAN 18 can use TCP/IP over Ethernet and industry-standard protocols, including NFS, CIFS, SOAP, XML, LDAP, and SNMP, although other types and numbers of communication networks, can be used.

The LANs 16 and 24 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN 18 may comprise any wide area network (e.g., Internet), although any other type of traffic network topology may be used.

Each of the client devices 14(1)-14(n) and server devices 20(1)-20(n) includes a processor, a memory, and a communication interface, which are coupled together by a bus or other communication link, although other numbers and types of network devices could be used. The client devices 14(1)-14(n) may further include an input device and a display device and may run interface applications, such as Web browsers, that may provide an interface to make requests for and receive content associated with applications hosted by the server devices 20(1)-20(n) via the LANs 16 and 24 and/or the WAN 18.

The server devices 20(1)-20(n) may provide content in response to requests directed toward the respective resources (e.g., applications) hosted by the server devices 20(1)-20(n) from the client devices via the LANs 16 and 24 and/or the WAN 18 according to the HTTP-based application RFC protocol or the CIFS or NFS protocol, for example. The server devices 20(1)-20(n) may be hardware or software or may represent a system with multiple server devices in a server device pool, which may include internal or external networks. Further, additional server devices may be coupled to the LAN 24 and many different types of applications may be available on each of the server devices 20(1)-20(n). Various network processing applications, such as CIFS applications, NFS applications, HTTP Web Server device applications, and/or FTP applications, may be operating on the server devices 20(1)-20(n) and transmitting data (e.g., files or web pages) in response to requests from the client devices 14(1)-14(n).

The APM administrator device 22 includes a processor, a memory, a communication interface, an input device, and a display device, which are coupled together by a bus or other communication link. A user of the APM administrator device 22 may communicate with the APM computing device 12 over the LAN 24 to configure the APM computing device 12, such as by establishing security and access policies, and to populate the persistent data store 42 with user data, such as credential information, for example, a described and illustrated in more detail later.

Although the exemplary network environment 10 with the APM computing device 12, client devices 14(1)-14(n), server devices 20(1)-20(n), APM administrator device 22, LANs 16 and 24 and the WAN 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, 3G traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
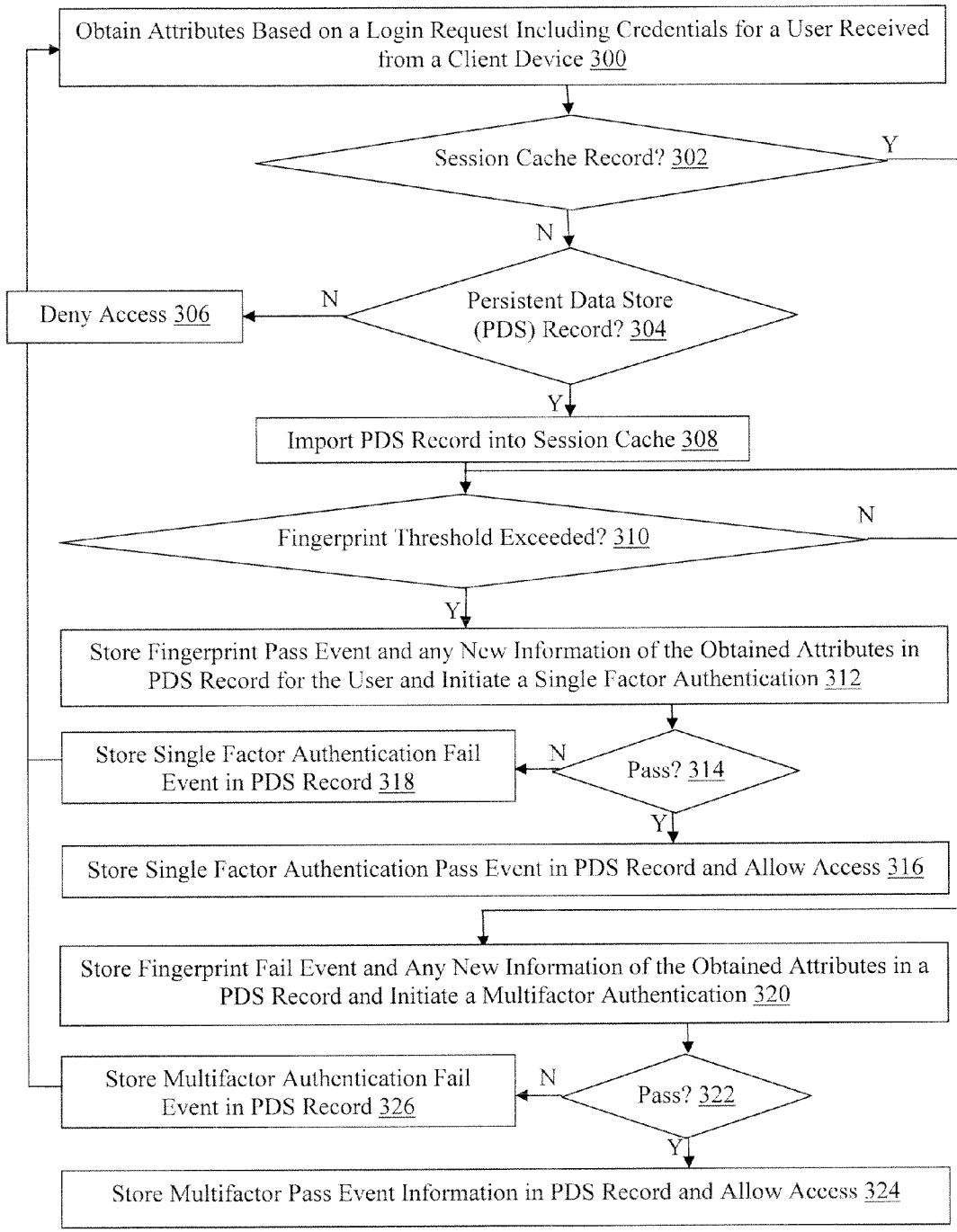
FIG. 3 is a flowchart of an exemplary method for authenticating users with a persistent data store based on a fingerprint.

An exemplary method for facilitating authentication using persistent data will now be described with reference to FIGS. 1-8. Referring more specifically to FIG. 3, a method for authenticating users with the persistent data store 42 based on a fingerprint is illustrated. In step 300 in this example, the APM computing device 12 obtains a first set of attributes based on a login request received from a user of one of the client devices 14(1)-14(n). The first set of attributes can include credentials for the user, such as a unique user name or ID and a password, submitted by the user through a login web page provided by the APM computing device 12 to the one of the client devices 14(1)-14(n), for example.

The APM computing device 12 can also obtain and/or determine other attributes included in the first set of attributes from the received login request, such as from one or more headers included with the request, for example. Exemplary attributes in addition to credentials can include a user group associated with the user, a geographic location of the user, the type of web browser from which the login request was received, the type and/or operating system of the one of the client devices 14(1)-14(n), and/or the time of the login attempt, for example, although other attributes can also be obtained.

In step 302, the APM computing device 12 determines whether a record exists in one of the session caches 40(1)-40(n) for the user. In this example, the login request includes credentials including a unique user name or ID which can be compared to the records in one or more of the session caches 40(1)-40(n) to determine whether there is a match. Each of the session caches 40(1)-40(n) can be populated based on records, or portions of records, imported from the persistent data store 42, as described and illustrated in more detail later. Optionally, the one of the session caches 40(1)-40(n) can be associated with one of the TMMs 36(1)-36(n) that received the login request from the one of the client devices 14(1)-14(n). If the APM computing device 12 determines a record for the user does not exist in one of the session caches 40(1)-40(n), then the No branch is taken to step 304.

In step 304, the APM computing device 12 determines whether a record for the user exists in the persistent data store 42, such as based on a match of a unique user name or ID in the record, for example. In this example, the persistent data store 42 is initially populated and periodically updated by a user of the APM administrator device 22 to contain records for each user authorized to access resources hosted by the server devices 20(1)-20(n), although the persistent data store 42 can be initially populated in other manners.

Referring more specifically to FIG. 4, a schema corresponding to exemplary attributes maintained by the APM computing device 12 in each record of the persistent data store 42 in one example is illustrated. In the example illustrated in FIG. 4, each record in the persistent data store 42 includes a unique user ID, a user name, a password, and a user group, each of which can be established, at least initially, by an administrator user of the APM administrator device 22, for example. Additionally, in this example, the records include a number of consecutive login failures and a lockout expiration for managing user lockout. Each of the records of the persistent data store 42 further includes one or more flags, such as an invalidity flag and an update flag, which are used as described and illustrated in more detail later. Other attributes can also be maintained in the records of the persistent data store 42 in other examples.

Referring back to FIG. 3, if the APM computing device 12 determines in step 304 that a record for the user does not exist in the persistent data store 42, then the No branch is taken to step 306 and the user is not authorized to access any resources hosted by the server devices 20(1)-20(n). Accordingly, in step 306, the APM computing device 12 denies the login request received from the user of the one of the client devices 14(1)-14(n) in step 300. Optionally, the APM computing device 12 can send a request denied web page to the one of the client devices 14(1)-14(n), for example, although any other method of indicating to the user that the login request received in step 300 is denied can also be used. Referring back to step 304, if the APM computing device 12 determines that a record for the user does exist in the persistent data store 42, then the Yes branch is taken to step 308.

In step 308, the APM computing device 12 imports at least a portion of the record from the persistent data store 42 into a record for the user in one of the session caches 40(1)-40(n). Optionally, if the one of the session caches 40(1)-40(n) is at capacity, a record can be removed from the one of the session caches 40(1)-40(n) based on a least recently used basis, for example, although other methods for managing capacity of the session caches 40(1)-40(n) can also be used. In this example, the one of the session caches 40(1)-40(n) includes relatively fast memory storage (e.g., RAM) as compared to the persistent data store 42 (e.g., a SQL database). Importing the portion of the record of the persistent data store 42 to a record of the one of the session caches 40(1)-40(n) allows the APM computing device 12 to more efficiently process network traffic associated with the established session, as described and illustrated in more detail later.

Figure 5:
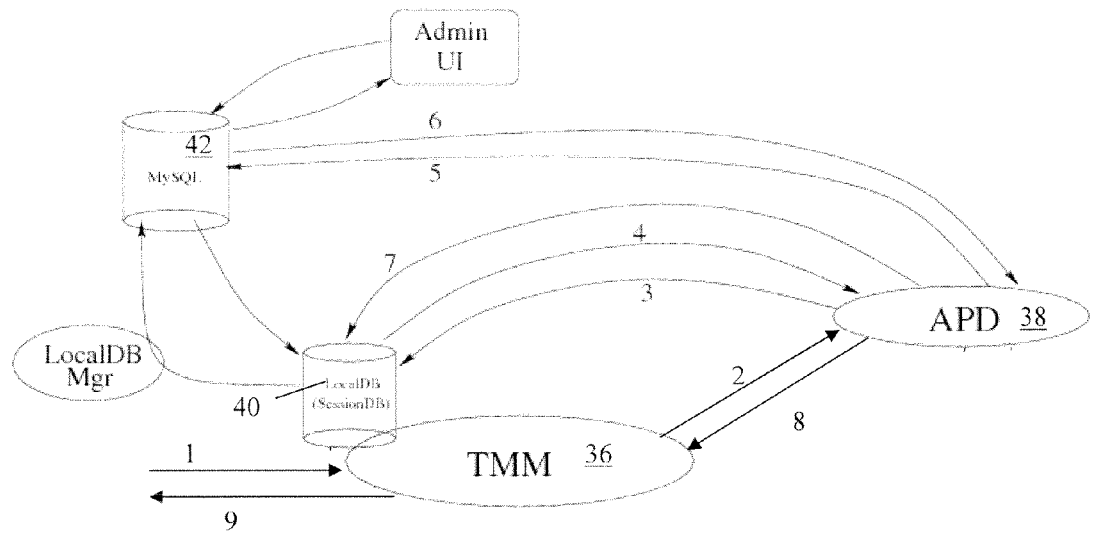
FIG. 5 is a functional flow diagram of a method for managing records during user authentication when a user record exists in a persistent data store.

Referring more specifically to FIG. 5, a flow diagram of an exemplary method for managing records during user authentication when a user record exists in a persistent data store is illustrated. In this example, the APM computing device 12 manages a request for a record for a user initiated from a TMM 36. The APD 38 attempts to retrieve the record from a session cache 40 (referring to as SessionDB in FIGS. 5-6), and determines that that record does not exist in the session cache 40. Accordingly, the APD 38 retrieves the record from the persistent data store 42 (referred to as MySQL in FIGS. 5-6), imports the record into the session cache 50, performs authentication (e.g. based on user credentials included in the record), and responds to the TMM 36 with the result of the authentication.

More specifically, in a first step in this example, the TMM 36 receives an authentication request from one of the client devices 14(1)-14(n). In a second step, the TMM 36 initiates a request for authentication corresponding to one or more attributes (e.g., credentials) included in the request received from the one of the client devices 14(1)-14(n). The APD 38 in a third step requests the record from the SessionDB 40 and, in a fourth step, the SessionDB 40 responds with an indication that the record is not currently stored in the SessionDB 40. Accordingly, in a fifth step, the APD 38 requests the record from the MySQL database 42 and, in a sixth step, the MySQL database 42 returns the record to the APD 38. In an eighth step, the APD 38 returns a result of the authentication to the TMM 36. In a ninth step, the TMM 36 initiates a single or multifactor authentication, as described and illustrated in more detail later.

Figure 6:
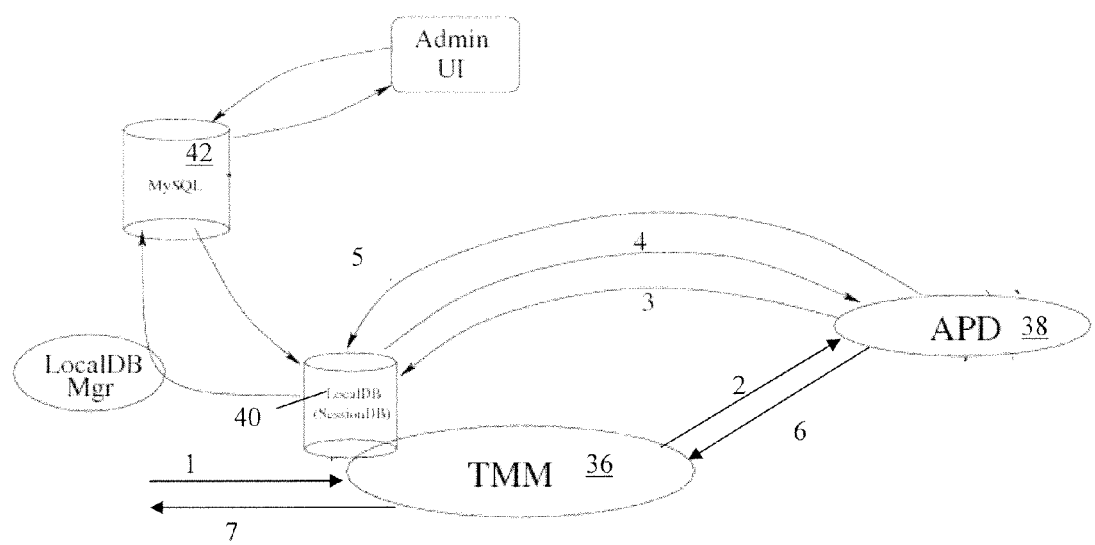
FIG. 6 is a functional flow diagram of a method of managing records during user authentication when a user record exists in a session cache.

Referring more specifically to FIG. 6, a flow diagram of an exemplary method for managing records during user authentication when a user record exists in a session cache is illustrated. In this example, the APD 38 responds to the TMM 36 that received the initial request with the information required to perform authentication without accessing the persistent data store 42 since the user record is stored in the session cache 40. More specifically, in a first step in this example, the TMM 36 receives an authentication request from one of the client devices 14(1)-14(n). In a second step, the TMM 36 initiates a request for authentication corresponding to one or more attributes (e.g., credentials) included in the request received from the one of the client devices 14(1)-14(n). The APD in a third step requests the corresponding record from the SessionDB 40 and, in a fourth step, the SessionDB 40 responds with the record. In a fifth step, the SessionDB 40 is updated by the APD 38 with additional information from the transaction, as described and illustrated in detail later. Next, in a sixth step, the APD returns a result of the authentication to the TMM 36. In a seventh step, the TMM 36 initiates a single or multifactor authentication, as described and illustrated in more detail later.

Referring back to FIG. 3, if the APM computing device 12 determines in step 302 that a record does exist for the user in the session cache and the Yes branch is taken, or subsequent to importing the record from the persistent data store 42 in step 308, the APM computing device 12 proceeds to step 310. In step 310, the APM computing device 12 compares a fingerprint including a second set of attributes associated with the user to a first set of the attributes obtained in step 300 to determine whether the fingerprint exceeds a threshold level of confidence based on correspondence of the fingerprint with the first set of attributes. The second set of attributes is retrieved from the record for the user in the one of the session cache 40(1)-40(n). In this example, subsequent to the initial population, the user records are updated, such as based on user activity with respect to logging in and out and/or accessing a network resource hosted by one of the server devices 20(1)-20(n), for example, as described and illustrated in more detail later.

Accordingly, the record imported into the one of the session caches 40(1)-40(n) for the user in this example can include information corresponding to the first set of attributes and associated with prior sessions for the user. For example, the record can include an indication of the type of client device utilized by the user in prior sessions. In another example, the record can include the geographic location from which a request originated from the user in prior sessions. Additionally, the record can include activity of the user during the prior sessions, such as the time of login, which network resources were accessed, and/or duration of the sessions, for example, although other attributes can also be maintained in the record for the user.

The fingerprint in this example can be a subset of the attributes included in the record, and the first set of attributes can be a subset of the attributes obtained in step 300, as indicated in a policy established by a user of the APM administrator device 22, for example. Accordingly, in one example, the policy can require comparison of the login time obtained in step 300 with a plurality of login times for prior sessions for the user, as stored in the record. Based on the comparison, the APM computing device 12 can determine whether a threshold level of confidence is exceeded. For example, if the current login time is within a one hour range of eighty percent of login times for prior sessions, then the APM computing device 12 can determine that the threshold level is exceeded.

In another example, the policy can require comparison of the type of web browser of the one of the client devices 14(1)-14(n) from which the login request was received in step 300 with the web browser used by the user during prior sessions, as stored in the record for the user imported from the persistent data store 42. Based on the comparison, the APM computing device 12 can determine whether a threshold level of confidence is exceeded. For example, if the web browser type used by the user in ninety percent of prior sessions is the same as the type of web browser from which the login request as received in step 300, then the APM computing device 12 can determine that the threshold level is exceeded.

Other permutations of attributes and other threshold levels can also be used as included in other policies established by the user of the APM administrator device 22 and stored on the APM computing device 12. Accordingly, the fingerprint comparison provides the APM computing device 12 with an increased level of confidence that the user is authorized to access one or more of the network resources hosted by one or more of the server devices 20(1)-20(n). The fingerprint comparison is advantageously made possible based on the persistent storage of attributes associated with prior user sessions maintained in the persistent data store 42. If the APM computing device 12 determines in step 310 that the fingerprint exceeds a threshold level of confidence, then the Yes branch is taken to step 312.

In step 312, the APM computing device 12 stores an indication of a fingerprint pass event (e.g. by incrementing a successful login count) and any new information included in the attributes obtained in step 300 in the record for the user in the one of the session caches 40(1)-40(n). The new information can include a time of login attempt, an increment of the number of times the user submitted a login request from a certain type of web browser, and/or any other information corresponding to the attributes stored in the record for the user in the persistent data store 42. In this example, the APM computing device 12 then initiates a single factor authentication of the user in step 312. The single factor authentication can be based on the user credentials submitted with the login request in step 300, for example.

In step 314, the APM computing device 12 determines whether the user passed the single factor authentication attempt. If the APM computing device 12 determines that the user passed the single factor authentication attempt, then the Yes branch is taken to step 316. In step 316, the APM computing device 12 stores an indication of the single factor authentication pass event in the record for the user in the one of the session caches 40(1)-40(n) (e.g. by incrementing a successful login count), establishes a session for the user, and allows access by the user to one or more network resources hosted by one or more of the server devices 20(1)-20(n).

The user can be allowed access to the one or more resources according to a policy associated with the user and established by a user of the APM administrator device 22, for example. Advantageously, the one or more network resources can be provided in response to the request from the user of the one of the client devices 14(1)-14(n) according to attributes stored in the record for the user in the persistent data store 42 that reflect historical activity of the user with respect to the one or more resources. Accordingly, the record for the user in the persistent data store 42 can effectively store preferences of the user with respect to a resource (e.g., an application) hosted by one or more of the server devices 40(1)-40(n) and provide the resource based on the preferences.

Referring back to step 314, if the APM computing device determines that the user did not pass the single factor authentication attempt, then the No branch is taken to step 318. In step 318, the APM computing device 12 stores an indication of the single factor authentication fail event in the record for the user in the one of the session caches 40(1)-40(n) (e.g. by incrementing a failed login count). Subsequent to storing the single factor authentication fail event, the APM computing device 12 proceeds to step 306 and denies the user access to the network resource(s), as described and illustrated earlier.

Referring back to step 310, if the APM computing device 12 determines that the fingerprint does not exceed a threshold level of confidence, then the No branch is taken to step 320. In step 320, the APM computing device 12 stores an indication of the fingerprint fail event in the record for the user in the one of the session caches 40(1)-40(n) (e.g. by incrementing a failed login count) and any new information corresponding to the attributes obtained in step 300.

Additionally, in step 320, the APM computing device 12 initiates a multifactor authentication for the user. The multifactor authentication can be based on credentials received with the login request in step 300 and an additional pass code or secret question/answer, for example, although any type and number of factors can be used in the multifactor authentication. Since the fingerprint comparison resulted in a failure in this example, the APM computing device 12 can increase the level of confidence that the user is authorized by using the multifactor authentication.

In step 322, the APM computing device 12 determines whether the user passed the multifactor authentication attempt. If the APM computing device 12 determines that the user passed the multifactor authentication attempt, then the Yes branch is taken to step 324. In step 324, the APM computing device 12 stores an indication of the multifactor authentication pass event in the record for the user in the one of the session caches 40(1)-40(n), establishes a session for the user, and allows access by the user to one or more network resources hosted by one or more of the server devices 20(1)-20(n), as described and illustrated earlier with reference to step 316.

Referring back to step 322, if the APM computing device 12 determines that the user did not pass the multifactor authentication attempt, then the No branch is taken to step 326. In step 326, the APM computing device 12 stores the multifactor authentication fail event in the record for the user in the one of the session caches 40(1)-40(n) (e.g. by incrementing a failed login count). Subsequent to storing the multifactor authentication fail event, the APM computing device 12 proceeds to step 306 and denies the user access to the network resource(s), as described and illustrated earlier.

Optionally, in some examples, the APM computing device 12 can determine in step 322 whether the user passed one or more but fewer than all factors of the multifactor authentication attempt. In these examples, if the APM computing device 12 determines that the user passed one or more but fewer than all factors of the multifactor authentication attempt, then the Yes branch can be taken to step 324. In step 324 in these examples, the APM computing device 12 stores an indication of a pass or fail event for each of the factors of the multifactor authentication in the record for the user in the one of the session caches 40(1)-40(n), establishes a session for the user, and allows limited or restricted access to one or more of the resources hosted by the server devices 20(1)-20(n) according to a policy established by a user of the APM administrator device 22, for example.

Figure 7:
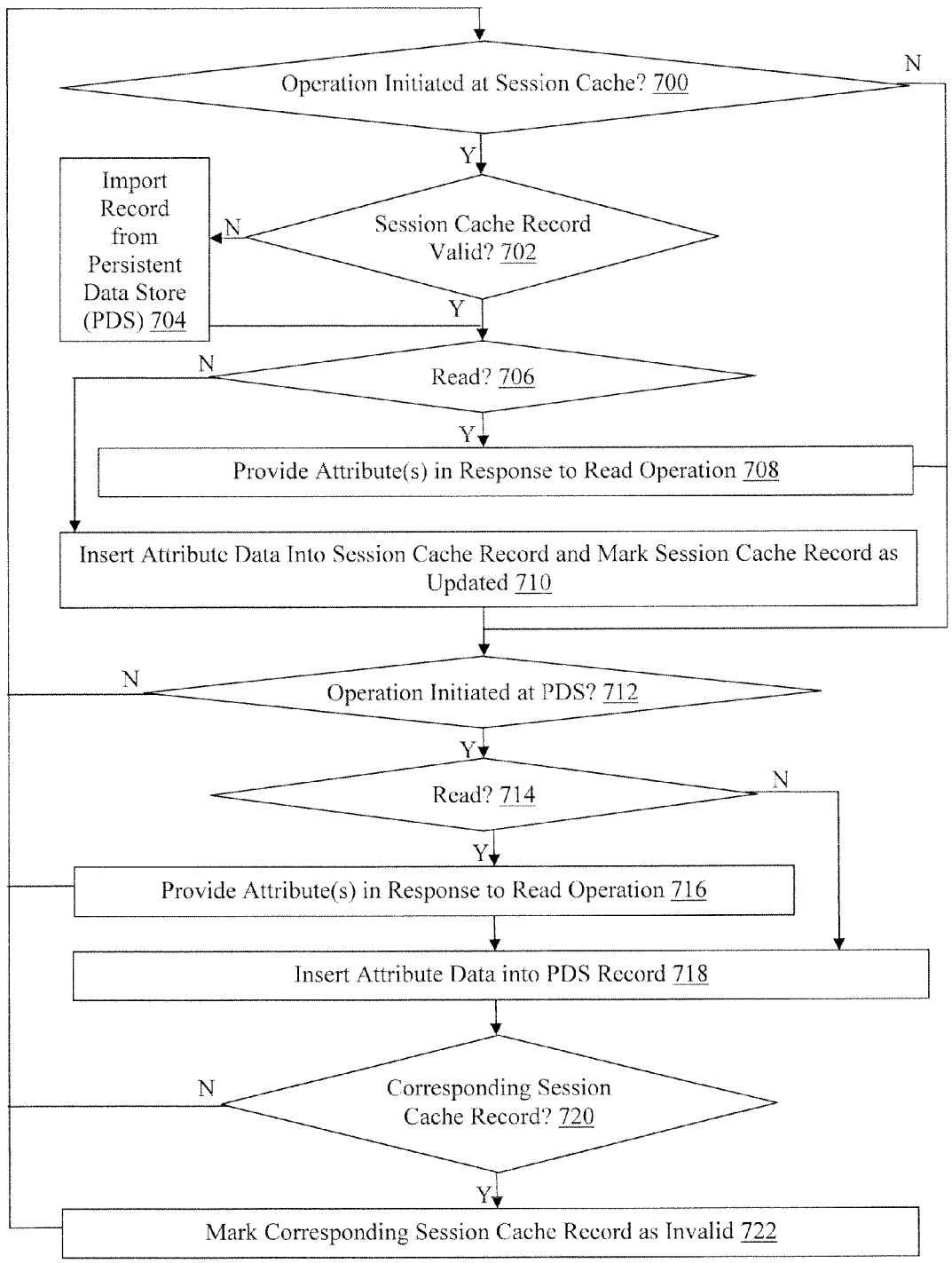
FIG. 7 is a flowchart of an exemplary method for processing operations initiated at a session cache and a persistent data store.

Referring more specifically to FIG. 7, a method of processing operations initiated at one of the session caches and at the persistent data store is illustrated. In step 700 in this example, the APM computing device 12 determines whether an operation is initiated at a record in one of the session caches 40(1)-40(n). The operation can be initiated from the data plane, such as by one of the TMMs 36(1)-36(n) associated with the one of the session caches 40(1)-40(n), for example. If the APM computing device 12 determines that an operation is initiated at one of the records in one of the session caches 40(1)-40(n), then the Yes branch is taken to step 702.

In step 702, the APM computing device 12 determines whether the record in the one of the session caches 40(1)-40(n) is valid. In this example, each record in each of the session caches 40(1)-40(n) can be marked as valid or invalid based on an invalidity flag stored in the record, for example, although other methods of marking the records of the session caches 40(1)-40(n) as invalid can also be used. Records in the session caches 40(1)-40(n) can be invalid as described and illustrated in more detail later with reference to step 722. If the APM computing device 12 determines in step 702 that the record in the one of the session caches 40(1)-40(n) is not valid, then the No branch is taken to step 704.

In step 704, the APM computing device 12 imports at least a portion of a corresponding record in the persistent data store 42 into a record for a same user in the one of the session caches 40(1)-40(n). Accordingly, if the record in the one of the session caches 40(1)-40(n) is invalid, the corresponding record in the persistent data store 42 has been updated. In order to propagate the update to the one of the session caches 40(1)-40(n) for an active user, the APM computing device 12 imports at least a portion (e.g. the updated portion) of the corresponding record from the persistent data store 42 into the record for the user in the one of the session caches 40(1)-40(n) in step 704 based on a match of a unique user name or ID in the corresponding record in the persistent data store 42, for example.

Subsequent to importing at least a portion of the record from the persistent data store 42, or if the APM computing device 12 determines that the record in the one of the session cache 40(1)-4(n) is valid in step 702 and the Yes branch is taken, the APM computing device 12 proceeds to step 706. In step 706, the APM computing device 12 determines whether the initiated operation is a read. If the APM computing device 12 determines that the initiated operation is a read operation, then the Yes branch is taken to step 708. In step 708, the APM computing device 12 provides attribute (s) in response to the read operation based on parameters included with the initiated read operation.

Referring back to step 706, if the APM computing device 12 determines that the operation is not a read operation, then the operation is a write operation and the No branch is taken to step 710. A write operation can include attribute data corresponding to an update to one or more attributes stored in the record for the user in the one of the session caches 40(1)-40(n) and/or new attributes to be stored in the record for the user in the one of the session caches 40(1)-40(n). In one example, the attribute data can include an indication of a resource accessed by the user and associated time and duration. In another example, the attribute data can be a fingerprint or authentication pass or fail event, as described and illustrated earlier. Other types of attribute data can also be included in the write operation. Accordingly, a write at the one of the session caches 40(1)-40(n) generally will be initiated for an active user during a session established as described and illustrated earlier with reference to steps 316 and 324 of FIG. 3.

Accordingly, in step 710, the APM computing device 12 inserts the attribute data corresponding to the initiated write into the record for the user in the one of the session caches 40(1)-40(n) and marks the record as updated. In this example, each record in the session caches 40(1)-40(n) can be marked as updated or not updated based on an update flag stored in the record, for example, although other methods of marking the records as updated can also be used. The APM computing device 12 marks the record in the one of the session caches 40(1)-40(n) as updated to facilitate lazy updating of the corresponding record in the persistent data store 42 based on the write operation initiated at the one of the session caches 40(1)-40(n), as described and illustrated in more detail later with reference to FIG. 8.

Subsequent to inserting the attribute data, if the APM computing device 12 determines that an operation was not initiated at the one of the session caches 40(1)-40(n) in step 700, or during any prior step, the APM computing device 12 determines in step 712 whether an operation is initiated at the persistent data store 42. Operations at the persistent data store 42 are generally initiated at the control plane, such as though a user interface provided to a user of the APM administrator device 22, for example. If the APM computing device 12 determines that an operation is initiated at a record in the persistent data store 42, then the Yes branch is taken to step 714.

In step 714, the APM computing device 12 determines whether the operation is a read operation. If the APM computing device 12 determines that the initiated operation is a read operation, then the Yes branch is taken to step 716. In step 716, the APM computing device 12 provides attribute (s) in response to the read operation based on parameters included with the initiated read operation. In one example, the attribute(s) can be provided to the APM administrator device 12 as part of a report generated for an administrator user of the APM administrator device 22, for example.

Referring back to step 714, if the APM computing device 12 determines that the operation is not a read operation, then the operation is a write operation and the No branch is taken to step 718. In step 718, the APM computing device 12 inserts the attribute data corresponding to the initiated write into the record of the persistent data store 42.

In step 720, the APM computing device 12 determines whether there is a corresponding record in one of the session caches 40(1)-40(n) for a same user as associated with the record in the persistent data store 42. Generally, a corresponding record in one of the session caches 40(1)-40(n) will be associated with an active session, although a corresponding record in one of the session caches 40(1)-40(n) can also be associated with an inactive session. The corresponding record in one of the session caches 40(1)-40(n) can be identified based on a match of a unique user name or ID of the record in the persistent data store 42, for example.

If the APM computing device 12 determines that there is a corresponding record in one of the session caches 40(1)-40(n), then the Yes branch is taken to step 722. In step 722, the corresponding record in the one of the session caches 40(1)-40(n) is marked as invalid, such as by setting an invalidity flag of the record, for example. By marking the record as invalid, the APM computing device 12 can indicate that some attribute data for the user has been updated in the persistent data store 42 and may be required to be imported to the session cache 40(1)-40(n), as described and illustrated earlier with reference to step 704, in order to maintain consistency.

Accordingly, in this example, the APM computing device 12 monitors for operations initiated at the session caches 40(1)-40(n) and at the persistent data store 42 and ensures that any attributes in the session caches 40(1)-40(n) reflect any updates made in the persistent data store 42. Since the persistent data store 42 is not utilized for active sessions, synchronization of the persistent data store 42 is relatively less critical and the persistent data store 42 can be periodically updated to reflect updates made in the session caches 40(1)-40(n).

Figure 8:
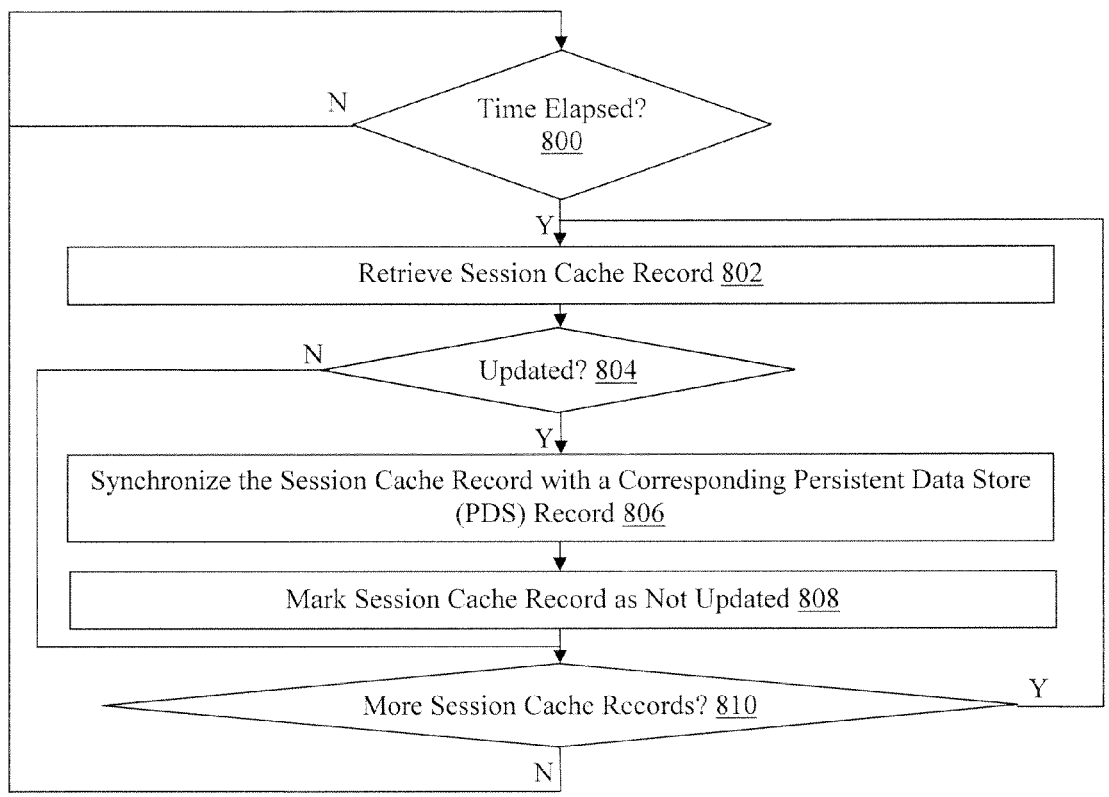
FIG. 8 is a flowchart of an exemplary method for updating a persistent data store.

Referring more specifically to FIG. 8, an exemplary method of updating the persistent data store 42 is illustrated. In step 800 in this example, the APM computing device 12 determines whether a specified time has elapsed. The time period can be established by a user of the APM administrator device 22, for example, and can be stored in the memory 28 of the APM computing device 12. If the APM computing device 12 determines that the specified time period has not elapsed, then the No branch is taken back to step 800 and the APM computing device essentially waits for the specified time to elapse. If the APM computing device 12 determines that the specified time has elapsed, then the Yes branch is taken to step 802.

In step 802, the APM computing device 12 retrieves one of the records from one of the session caches 40(1)-40(n). In step 804, the APM computing device 12 determines whether the record retrieved from the one of the session caches 40(1)-40(n) is marked as updated. Records of the session caches 40(1)-40(n) can be marked as updated based on an update flag, as described and illustrated earlier with reference to step 710 of FIG. 7, for example, although records of the session caches 40(1)-40(n) can also be marked as updated based on other methods (e.g., timestamps). If the APM computing device 12 determines that the one record of the one of the session caches 40(1)-40(n) has been marked as updated, then the Yes branch is taken to step 806.

In step 806, the APM computing device 12 synchronizes the record of the one of the session caches 40(1)-40(n) with a corresponding record in the persistent data store 42. The corresponding record in the persistent data store 42 can be identified based on a match of a unique user name or ID of the record of the one of the session caches 40(1)-40(n), for example. Accordingly, the APM computing device 12 updates the corresponding record in the persistent data 42 store based on the attributes currently included in the record of the one of the session caches 40(1)-40(n). The record of the one of the session caches 40(1)-40(n) may have been updated as described and illustrated earlier with reference to step 710 of FIG. 7, for example, although other methods of updating the record of the one of the session caches 40(1)-40(n) can also be used.

In step 808, the APM computing device 12 marks the record of the one of the session caches 40(1)-40(n) as not updated. For example, the APM computing device 12 can reset an update flag of the record of the one of the session caches 40(1)-40(n) to indicate that the record has not been updated since a previous synchronization.

In step 810, the APM computing device 12 determines whether there are more records in the one of the session caches 40(1)-40(n) that have not been retrieved in the current traversal of the one of the session caches 40(1)-40(n). If the APM computing device 12 determines that there are more records, then the Yes branch is taken back to step 802 and another record is retrieved from the one of the session caches 40(1)-40(n), as described and illustrated earlier. However, if the APM computing device 12 determines in step 810 that there are no more records, then the No branch is taken to the step 800 and the APM computing device 12 effectively waits for another time period to elapse before initiating another traversal of the one of the session caches 40(1)-40(n) and synchronizing the persistent data store 42. Optionally, steps 800-810 are performed in parallel or serially for each of the session caches 40(1)-40(n).

With this technology, a persistent data store is maintained and utilized to store records including attributes associated with users and user sessions which can be accessed in the event of a service failure or restart. By storing the attributes, information regarding user activity can persist across a plurality of sessions and can be leveraged to more effectively control and provide network resources based on user access and usage patterns. The persistent storage of the attributes also allows for a more efficient authentication process whereby historical information is used to determine a confidence level that a user is authorized, and provide an appropriate authentication process based on the confidence level. Additionally, with this technology, session caches are maintained and periodically synchronized with a persistent data store to reduce latency of interactions with the attributes for active sessions.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for facilitating improved user authentication using persistent data, the method comprising:
    obtaining, by an access policy management device, a first set of attributes based on a login request received from a client device, the first set of attributes including at least credentials for a user of the client device;
    identifying, by the access policy management device, a persistent data store record for the user and importing at least a second set of attributes associated with the user and included in the persistent data store record into a session cache record for the user;
    generating, by the access policy management device, a confidence level based on a comparison of a fingerprint comprising at least a subset of the second set of attributes to the first set of attributes, wherein the at least a subset of the second set of attributes comprise data obtained during prior sessions for the user;
    determining, by the access policy management device, when the confidence level exceeds a threshold confidence level;
    initiating, by the access policy management device, a multifactor authentication to determine when the user is authenticated by requesting authentication data from the client device for each of a plurality of factors, when the determining indicates that the confidence level does not exceed the threshold confidence level; and
    establishing, by the access policy management device, a session for the user and allowing access by the user to one or more network resources, when the determining indicates that the user is authenticated.

2. The method of claim 1, further comprising:
    initiating, by the access policy management device, a write of user data associated with the user at the session cache record; and marking, by the access policy management device, the session cache record as updated.

3. The method of claim 1, further comprising:
   initiating, by the access policy management device, a write of user data associated with the user at the persistent data store record;
   and
   marking, by the access policy management device the session cache record as invalid.

4. The method of claim 1, further comprising:
   periodically retrieving, by the access policy management device, the session cache record;
   determining, by the access policy management device, when the session cache record is marked as updated; and
   synchronizing, by the access policy management device, the persistent data store record and the session cache record and marking the session cache record as not updated when the determining indicates that the session cache record is marked as updated.

5. The method of claim 1, wherein the establishing further comprises storing an indication of an authentication pass event in the persistent data store record and the method further comprises denying, by the access policy management device, access by the user to the one or more network resources and storing an indication of an authentication fail event in the session cache record for the user, when the determining indicates that the user is authenticated.

6. An access policy management device, comprising a processor and a memory coupled to the processor, wherein the memory comprises programmed instructions stored in the memory and a session cache and the processor is configured to be capable of executing the programmed instructions stored in the memory to:
   obtain a first set of attributes based on a login request received from a client device, the first set of attributes including at least credentials for a user of the client device;
   identify a persistent data store record for the user and importing at least a second set of attributes associated with the user and included in the persistent data store record into a record for the user in the session cache;
   generate a confidence level based on a comparison of a fingerprint comprising at least a subset of the second set of attributes to the first set of attributes;
   determine when the confidence level exceeds a threshold confidence level;
   initiate a multifactor authentication to determine when the user is authenticated by requesting authentication data from the client device for each of a plurality of factors, when the determining indicates that the confidence level does not exceed the threshold confidence level; and
   establish a session for the user and allowing access by the user to one or more network resources, when the determining indicates that the user is authenticated.

7. The access policy management device of claim 6, wherein the processor coupled to the memory is further configured to be capable of executing the programmed instructions stored in the memory to:
   initiate a write of user data associated with the user at the session cache record; and
   mark the session cache record as updated.

8. The access policy management device of claim 6, wherein the processor coupled to the memory is further configured to be capable of executing the programmed instructions stored in the memory to:
   initiate a write of user data associated with the user at the persistent data store record;
   and
   mark the session cache record as invalid.

9. The access policy management device of claim 6, wherein the processor coupled to the memory is further configured to be capable of executing the programmed instructions stored in the memory to:
   periodically retrieve the session cache record;
   determine when the session cache record is marked as updated; and
   synchronize the persistent data store record and the session cache record and marking the session cache record as not updated when the determining indicates that the session cache record is marked as updated.

10. The access policy management device of claim 6, wherein the establishing further comprises storing an indication of an authentication pass event in the persistent data store record and the processor coupled to the memory is further configured to be capable of exe executing the programmed instructions stored in the memory to deny access by the user to the one or more network resources and storing an indication of an authentication fail event in the session cache record for the user, when the determining indicates that the user is authenticated.

11. A non-transitory computer readable medium having stored thereon executable instructions for facilitating improved user authentication using persistent data comprising executable code which when executed by a processor, causes the processor to perform steps comprising:
   obtaining a first set of attributes based on a login request received from a client device, the first set of attributes including at least credentials for a user of the client device;
   identifying a persistent data store record for the user and importing at least a second set of attributes associated with the user and included in the persistent data store record into a session cache record for the user;
   generating a confidence level based on a comparison of a fingerprint comprising at least a subset of the second set of attributes to the first set of attributes;
   determining when the confidence level exceeds a threshold confidence level;
   initiating a multifactor authentication to determine when the user is authenticated by requesting authentication data from the client device for each of a plurality of factors, when the determining indicates that the confidence level does not exceed the threshold confidence level; and
   establishing a session for the user and allowing access by the user to one or more network resources, when the determining indicates that the user is authenticated.

12. The non-transitory computer readable medium of claim 11, wherein the executable code when executed by the processor further causes the processor to perform steps further comprising:
   initiating a write of user data associated with the user at the session cache record; and
   marking the session cache record as updated.

13. The non-transitory computer readable medium of claim 11, wherein the executable code when executed by the processor further causes the processor to perform steps further comprising:
   initiating a write of user data associated with the user at the persistent data store record;
   and
   marking the session cache record as invalid.

14. The non-transitory computer readable medium of claim 11, wherein the executable code when executed by the processor further causes the processor to perform steps further comprising:
   periodically retrieving the session cache record;
   determining when the session cache record is marked as updated; and
   synchronizing the persistent data store record and the session cache record and marking the session cache record as not updated when the determining indicates that the session cache record is marked as updated.

15. The non-transitory computer readable medium of claim 11, wherein the establishing further comprises storing an indication of an authentication pass event in the persistent data store record and the executable code when executed by the processor further causes the processor to perform steps further comprising denying access by the user to the one or more network resources and storing an indication of an authentication fail event in the session cache record for the user, when the determining indicates that the user is authenticated.

* * * * *